(12) United States Patent
Arnold

(10) Patent No.: US 10,406,500 B2
(45) Date of Patent: Sep. 10, 2019

(54) COMPOSITION COMPRISING NUCLEATED NANODIAMOND PARTICLES

(71) Applicant: Christopher J. Arnold, Lombard, IL (US)

(72) Inventor: Christopher J. Arnold, Lombard, IL (US)

(*) Notice: Subject to any disclaimer, the term of this patent is extended or adjusted under 35 U.S.C. 154(b) by 0 days.

(21) Appl. No.: 15/677,816

(22) Filed: Aug. 15, 2017

(65) Prior Publication Data

US 2017/0368527 A1  Dec. 28, 2017

Related U.S. Application Data

(63) Continuation of application No. 11/701,063, filed on Jan. 31, 2007.

(60) Provisional application No. 60/764,177, filed on Feb. 1, 2006.

(51) Int. Cl.
| | | |
|---|---|---|
| *B01J 19/08* | (2006.01) | |
| *C01B 32/26* | (2017.01) | |
| *C10M 125/02* | (2006.01) | |
| *B82Y 30/00* | (2011.01) | |
| *B82Y 40/00* | (2011.01) | |

(52) U.S. Cl.
CPC ........... *B01J 19/081* (2013.01); *B01J 19/088* (2013.01); *C01B 32/26* (2017.08); *C10M 125/02* (2013.01); *B01J 2219/0877* (2013.01); *B01J 2219/0879* (2013.01); *B01J 2219/0894* (2013.01); *B82Y 30/00* (2013.01); *B82Y 40/00* (2013.01); *C01P 2004/32* (2013.01); *C01P 2004/64* (2013.01); *C10M 2201/041* (2013.01); *C10N 2220/082* (2013.01); *C10N 2230/06* (2013.01); *C10N 2240/02* (2013.01); *Y10S 977/775* (2013.01); *Y10S 977/896* (2013.01); *Y10S 977/902* (2013.01)

(58) Field of Classification Search
None
See application file for complete search history.

(56) References Cited

U.S. PATENT DOCUMENTS

| | | | |
|---|---|---|---|
| 2005/0202173 A1* | 9/2005 | Mills ................. | B01J 19/088 427/249.7 |
| 2005/0220829 A1 | 10/2005 | Sung et al. | |
| 2007/0148080 A1 | 6/2007 | Lueking et al. | |

OTHER PUBLICATIONS

Pearce et al.,"Production of nanocrystalline diamond by laser ablation at the solid/liquid interface", Diamond and Related Materials 13 (2004) 661-665.*
Yang et al., "Growth of diamond nanocrystals by pulsed laser ablation of graphite in liquid", Diamond and Related Materials 16 (2007) 725-729.*
Yusa, "Nanocrystalline diamond directly transformed from carbon nanotubes under high pressure", Diamond and Related Materials 11, pp. 87-91 (2002).
Chen et al., "Spherical nanometer-sized diamond obtained from detonation", Diamond and Related Materials 9 (23000) 1722-1725.

* cited by examiner

*Primary Examiner* — Kishor Mayekar
(74) *Attorney, Agent, or Firm* — McAndrews, Held & Malloy, Ltd.

(57) ABSTRACT

This invention relates to a production method for non-detonation synthesis nanodiamond by exposing carbonaceous feedstock to a dense plasma focus. The nucleated nanodiamond particles have characteristics that differentiate them from known forms of nanodiamond. For instance, the nucleated nanodiamond particles are substantially spherical and have a substantially smooth surface, as may be demonstrated by TEM. The nucleated nanodiamond particles are also free of graphite and detonation carbon contaminants. The identity of the nanodiamond particles has been confirmed through raman spectra, for example. The nanodiamond particles have also been found to be effective as a lubricant composition when combined with a carrier oil.

12 Claims, 7 Drawing Sheets

COMPOSITION COMPRISING NUCLEATED NANODIAMOND PARTICLES

This application is a continuation of U.S. Non-provisional application Ser. No. 11/701,063, filed on Jan. 31, 2007, which claims priority to U.S. Provisional Application No. 60/764,177 filed on Feb. 1, 2006 and disclosure document 611847, filed Jan. 26, 2007.

BACKGROUND OF THE INVENTION

1. Field of the Invention

This invention relates to a method for producing non-detonation synthesis nanodiamond, and more specifically to a method for producing fractional-nanometer to nanometer sized diamonds from carbonaceous materials by discrete plasma irradiation, such as may be produced by the pulsed plasma drive electromagnetic motor generator of U.S. Pat. No. 6,271,614 B1.

2. Background of the Invention

Nanodiamonds are known to have various technological applications, including as fine polishing and grinding abrasives. Other possible uses for nanodiamonds include their use as powders with high thermal conductivity for use in heat sinks, lubrication, semiconductors, superconductors and as feedstock for larger synthetic diamond production. Nanodiamonds also can be utilized as an admixture in advanced composite materials to enhance thermal conductivity, surface hardness and rigidity.

Several techniques exist to produce nanodiamond. However, these processes require extreme conditions, such as high pressure, high temperature, or high irradiation fluence. For example, efforts at the Mx-Planck-Institut in Stuttgart Germany, detailed in Wesolowski et al., Appl. Phys. Lett. 71 (14), pp 1948-1950, Oct. 6, 1997, have produced nanodiamonds but only after soot is irradiated for 30 hours at temperatures between 700 and 1100 degrees C. at high ion fluences of more than $10^{19}$ ions-$cm^{-2}$. Earlier research at the same institute, detailed in Banhart et al., Nature 382, pp. 433-435 (1996), discloses a method for diamond production by irradiating carbon onions with high electron fluences of more than $10^{24}$ $cm^{-2}$ at a sample temperature of 700 degrees C.

Detonation nanodiamond is well-known within the scientific literature. Detonation nanodiamond is known to be electrically non-conductive and contaminated with detonation byproducts, making it expensive to purify. Nevertheless, explosive shock methods remains the mass-production method for nanodiamond powder. Other sources and methods for obtaining nanodiamonds can be found in U.S. Pat. No. 5,709,577, issued on Jan. 20, 1998.

None of these methods, however, produce loose, nucleated particles of non-detonation synthesis nanodiamond.

The present invention is directed to a process for producing sub-nanometer and nanometer sized diamonds from any of a myriad of carbonaceous materials in millisecond bursts on a continuous basis. The process relies on non-equilibrium plasma, such as that which may be produced by the pulsed plasma drive electromagnetic motor generator of U.S. Pat. No. 6,271,614 B1.

The nanodiamonds produced by this process differ from those disclosed in the above-cited prior art in a number of important aspects.

SUMMARY OF THE INVENTION

It is an object of the invention to provide a method for producing high purity, non-detonation synthesis nanodiamond that overcomes many of the disadvantages of the prior art in producing detonation nanodiamond.

Another object of the present invention is to provide an economical method for producing non-detonation synthesis nanodiamond. A feature of the invention is that a carbonaceous feedstock material can be transformed to non-detonation synthesis nanodiamond by plasma contact, for example at room temperature. Another feature of the invention is the absence of normally required acid dissolution to isolate the diamond product from the carbonaceous material. An advantage of the invention is the elimination of purification methods that typically require high temperature treatment, high pressure treatment, or chemical processing such as with acids.

Still another object of the present invention is to provide a process for producing non-detonation synthesis nanodiamond using discrete plasma processing, such as using energies found in a dense plasma focus. Where non-diamond materials are generated, they can be easily separated by chemical or non-chemical processing. Briefly, the invention provides a method for producing diamond particles, the method comprising exposing carbonaceous material to high energy plasma radiation, at ambient temperature and pressure for example, for a time sufficient to transform the carbonaceous material to diamond. The pressure and temperature can be adjusted away from ambient with equally successful results. The invention also provides a method for producing diamonds comprising subjecting a carbonaceous compound to at least approximately 50 MeV ion radiation, such as at room temperature and pressure, in a chamber for a time sufficient to transform the carbonaceous compound into diamond particles.

Another object of the present invention is to provide a composition comprising nucleated nanodiamond particles, the particles being characterized by a raman spectra that is indicative of diamond-like carbon. In contrast to detonation synthesis nanodiamond, the nanodiamond particles of the present invention are substantially spherical and have a substantially smooth surface. Additionally, in contrast to nanodiamond produced by other methods, the nanodiamond particles of the present invention are substantially free of graphite.

Another object of the present invention is to provide a lubricant composition that takes advantage of the properties of the substantially spherical nanodiamond particles. The lubricant comprises at least the composition comprising nucleated nanodiamond particles having the properties described above and a carrier oil. In some embodiments, the lubricant may comprise very small amounts of nanodiamond particles, such as less than 5 grams of nanodiamond per gallon of carrier oil.

BRIEF DESCRIPTION OF THE DRAWINGS

A clear conception of the advantages and features of one or more embodiments will become more readily apparent by reference to the exemplary, and therefore non-limiting, embodiments illustrated in the drawings.

DETAILED DESCRIPTION OF THE INVENTION

Figure 1:
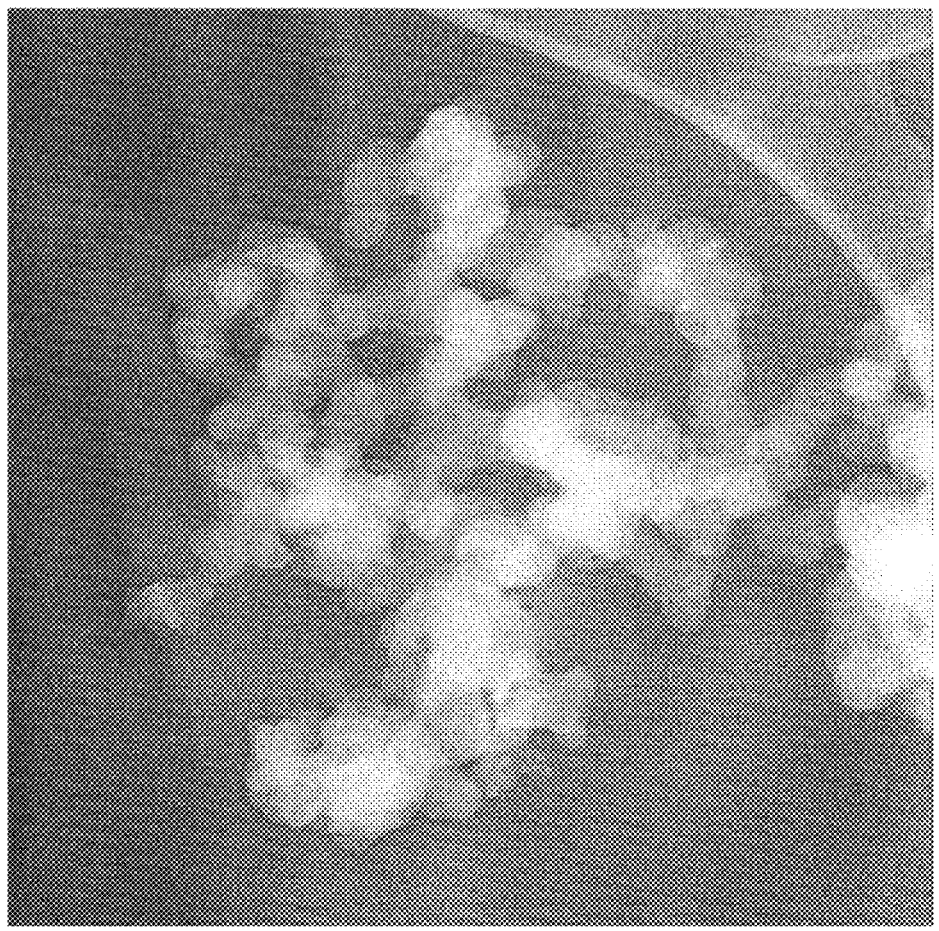
FIG. 1 is a Transmission Electron Microscopy (TEM) image of nanodiamond particles produced in accordance with the present invention, which shows the substantially spherical nature of the nanodiamond particles.

The present invention encompasses a method whereby dense plasma focus irradiation of bulk carbonaceous material at low pressure (e.g. $10^{-1}$ Torr) or higher and ambient temperature or higher, transforms the carbonaceous material into diamond-like carbon (DLC). Specifically, nanometer-sized diamond-like carbon particles are formed under specific protocols, while alterations allow larger polycrystallites to be created.

The method comprises exposing carbonaceous material to a dense plasma focus radiation, such as may be produced by the pulsed plasma drive electromagnetic motor generator of U.S. Pat. No. 6,271,614 B1, at suitable temperature and pressure, and using a flux rate and irradiation time sufficient to transform the carbonaceous material into nanoparticles of diamond-like carbon (DLC). The dense plasma focus device may comprise one or more DC power sources and one or more magnetic elements, one or more electromagnetic elements, one or more focus elements, and a reaction chamber. The DC power source may be above 12 volts, alternatively above 45 volts, and preferably below 65 volts. The one or more magnetic or electromagnetic elements may form an arcuate or circular sleeve, such as a circular inner assembly. The device may also comprise a rotor, to which the one or more focus elements, the one or more magnetic elements, and/or the one or more electromagnetic elements may be affixed.

The method can be utilized to produce diamonds from any high-carbon content carbonaceous material via heavy ion (e.g. mass greater than approximately 60 amu) irradiation having energies greater than 50 MeV. The energy of the radiation may vary, but must be adequate to first produce damage to the lattice of the carbonaceous material. Conversely, the energy must not be so high as to have the ion completely pass through the carbonaceous material with no transference of energy to the carbonaceous material. In some embodiments, energy between 50 MeV and 1000 MeV is suitable.

Without being bound by theory, it is believed that the carbonaceous feedstock to split into ionized elemental forms during the momentary irradiation of the dense plasma focus. Then, when the plasma energy is reduced, and thus falls below the ionization energies of the constituents, the elemental forms recombine and reconstitute into solid and gaseous forms. It is believed that this unique formation mechanism is responsible for the unique properties of the diamond-like carbon nanoparticles that are produced.

Time of exposure to the carbonaceous material to the ion radiation will depend on the fluence and flux rates. If a particular process time is desired, the fluence and flux rates may be adjusted to arrive at the exposure duration. In some embodiments, the fluence may be between about $10^{12}$ ions per $cm^2$ and about $10^{16}$ ions per $cm^2$. In some embodiments, the flux rate may be between $10^{10}$ ions per $cm^2$ per second and about $10^{12}$ ions per $cm^2$ per second.

In some embodiments, the carbonaceous feedstock material may comprise liquid hydrocarbons, solid hydrocarbons, or gaseous hydrocarbons. Preferably the carbonaceous feedstock contains at least 5 percent carbon by weight, alternatively at least 20 percent carbon by weight. In some embodiments, the carbonaceous material may comprise graphite, lignite, coal, or combination thereof. In some embodiments, the carbonaceous material may comprise a hydrocarbon, such as a synthetic hydrocarbon, an organic oil, crude oil, petroleum distillates, and combinations thereof.

Acid dissolution may produce a discrete benefit such as increasing particle surface attractions, however such processing is not required to remove graphite or detonation contaminants which are present in other nanodiamond, as no graphite or detonation contaminants are present in the nanodiamond of the present invention.

The nucleated nanodiamond particles prepared in accordance with the present invention may be produced to have a range of diameters. In some embodiments, the nanodiamond particles having diameters between about 0.01 and about 10 nm, alternatively between about 0.1 nm and about 2 nm. In some embodiments, the particles have diameters less than 5 micrometers.

Figure 2:
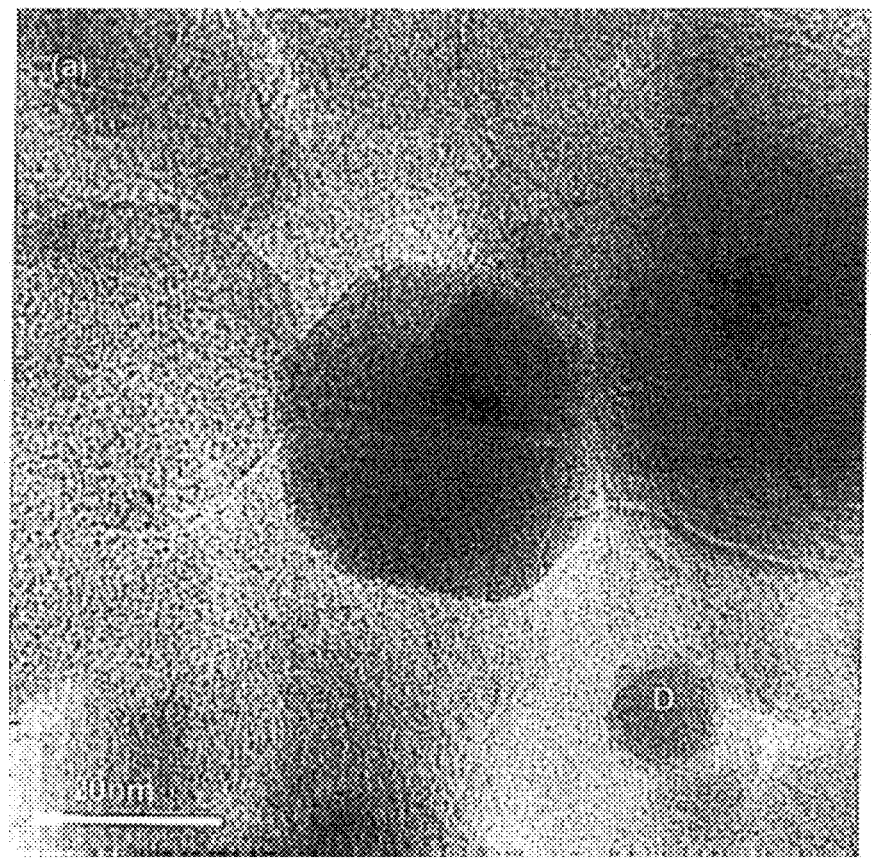
FIG. 2 is a Transmission Electron Microscopy (TEM) image of nanodiamond particles produced in accordance with the present invention, which shows the substantially spherical nature of the nanodiamond particles, such as at the portion labeled "D".
Figure 3:
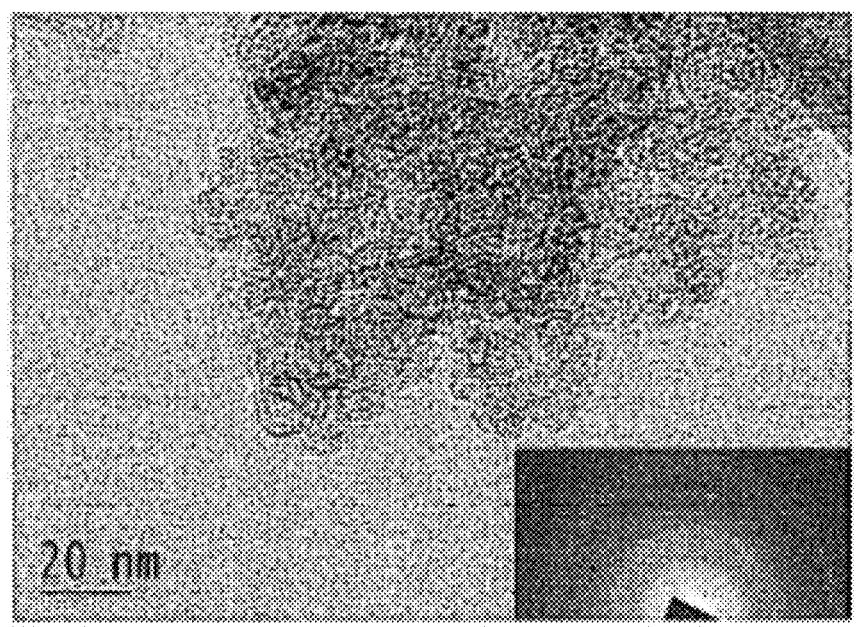
FIG. 3 is a Transmission Electron Microscopy (TEM) image of nanodiamond particles produced in accordance with the present invention, which shows the clustering of the substantially spherical nanodiamond particles.

The nucleated nanodiamond particles, produced as described above, were characterized using a number of tests. For example, the nucleated nanodiamond particles prepared in accordance with the present invention were characterized using high resolution and analytical Transmission Electron Microscopy (TEM). Sample results are shown in FIG. 1, FIG. 2, and FIG. 3.

FIG. 1 shows a number of substantially spherical nanodiamond particles having sizes on the nanometer scale. The substantially spherical nanodiamond particles shown in FIG. 1 are clustered together. FIG. 2 shows a number of substantially spherical nanodiamond particles, including one—labeled D—having a diameter of about 10 nm. FIG. 2 also demonstrates the substantially smooth surface of the nanodiamond particles. FIG. 3 shows a number of substantially spherical nanodiamond particles having diameters less than 20 nm clustered together. Together, these Figures illustrate nanodiamond particles that are substantially spherical and have a substantially smooth surface. These Figures also indicate that the nanodiamond particles are substantially free of graphite.

The nucleated nanodiamond particles prepared in accordance with the present invention were also characterized using raman spectroscopy. Sample results are shown in FIG. 4 and FIG. 5.

Figure 4:
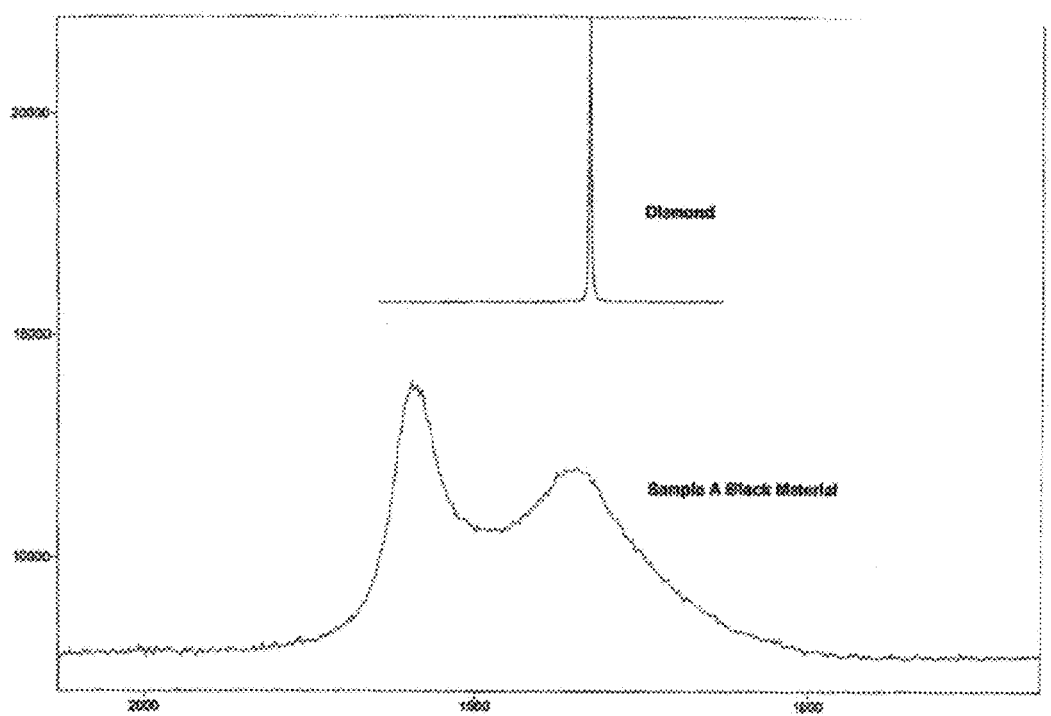
FIG. 4 is a Raman Spectrum of nanodiamond particles produced in accordance with the present invention, which is generally indicative of diamond-like carbon, DLC.

FIG. 4 shows the raman spectroscopy signature of a sample of nanodiamond particles that is indicative of diamond-like carbon. However, the raman spectra is also characterized by the complete absence of an 1100 K band. In contrast, it is believed that all previously known diamond-like carbon, nanodiamond films, and detonation nanodiamond have the K band.

Figure 5:
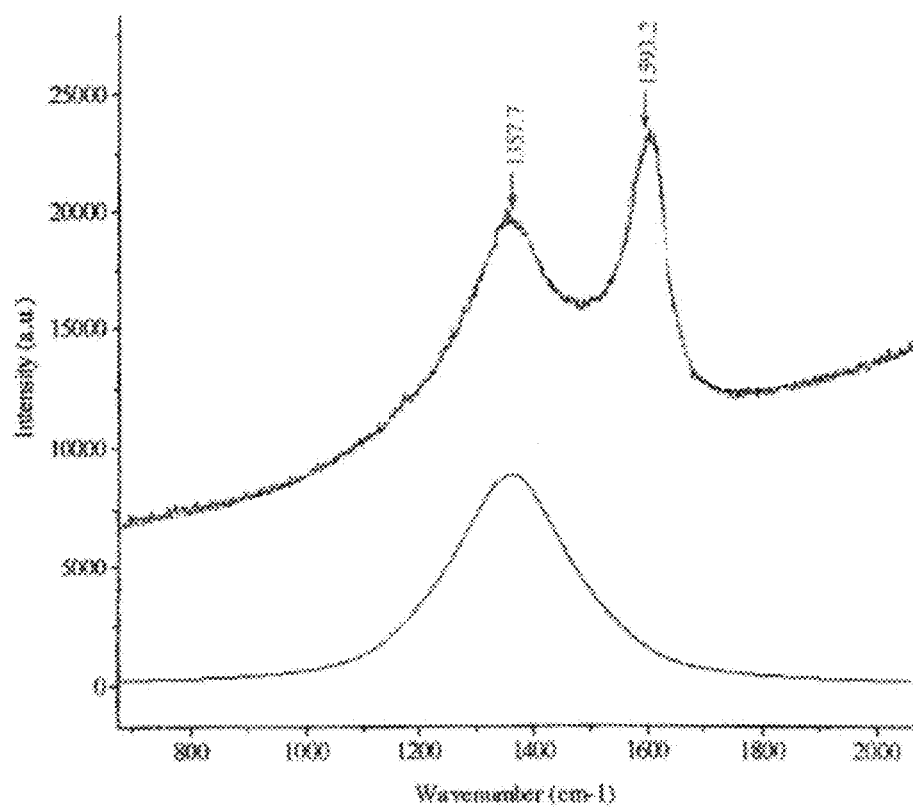
FIG. 5 is a Raman Spectrum of nanodiamond particles produced in accordance with the present invention, which is generally indicative of a hydrogenated diamond-like carbon, DLC.

FIG. 5 shows the raman spectroscopy signature of a sample of nanodiamond particles that is indicative of hydrogenated diamond-like carbon. More specifically, the raman spectroscopy signature is similar to a plasma-deposited films of tetrahedral hydrogenated amorphous carbon (ta-C:H) or Hydrogenated Diamond-Like Carbon (HDLC). Nanophase diamond is well known to adsorb and store hydrogen, an effect that was also indicated by the absence of hydrogen in the plasma reactor after preparation of the nanodiamond particles. Also similar with HDLC, the nanodiamond particles prepared in accordance with the present invention are electrically conductive.

Figure 6:
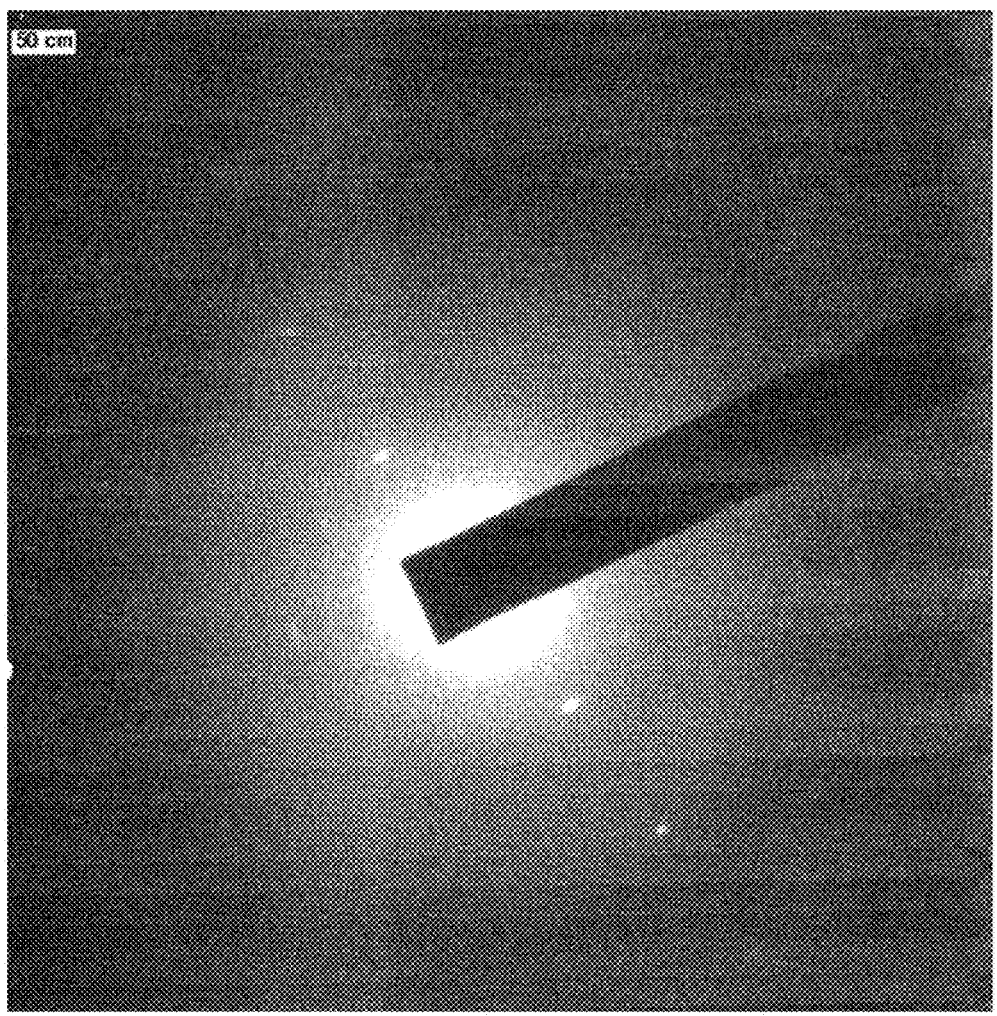
FIG. 6 is an Electron Diffraction Pattern (EDP) of nanodiamond particles produced in accordance with the present invention, which is generally indicative of nanodiamond.

The nucleated nanodiamond particles prepared in accordance with the present invention were also characterized using Electron Diffraction Patterns. FIG. 6 shows the Electron Diffraction Pattern (EDP) of nanodiamond particles produced in accordance with the present invention, which is generally indicative of nanodiamond and serves to further confirm the identity of the particles as nanodiamond.

The nanodiamond particles prepared in accordance with the present invention were also tested for application in a lubricant. For instance, testing at Falex, Inc. of Sugar Grove, Ill. revealed that a lubricant comprising a carrier oil and the nanodiamond particles greatly reduced contact bearing wear, reduced friction, and extended the useful life of the parent lubricant.

The testing included a four ball wear test with a 40 kg load that was performed in accordance with ASTM D 4172 B. The results of the test showed that once a bearing seat was worn in, friction produced by the sample of carrier oil containing the nanodiamond particles was reduced by about 48% over the sample of pure carrier oil. Also revealed in this test were the anti-scoring properties of the solution containing the nanodiamond particles, which produced a smooth satin finished bearing seat in contrast to the deeply scored surface of the sample tested using only the carrier oil. The sample containing the nanodiamond particles produced a virtually circular bearing seat, in contrast to the deeply scored oval bearing seat formed by testing with pure carrier oil. The test revealed that the lubricant containing the nanodiamond particles protected the finish while the carrier oil was virtually helpless in providing protection. As such, a lubricant comprising the diamond nanoparticles in a carrier oil may be effective to provide a smooth bearing seat that is substantially free of scoring, as demonstrated by a test run in accordance with ASTM D 4172 B.

The testing also included a test performed in accordance with ASTM D 2714, which involved the application of a heavier load, about 150 lbs. Two drops of each sample lubricant were used to perform this test. The lubricant comprising the nanodiamond particles protected the bearing surface, which wore 90% less than that tested with the pure carrier oil. The results of this test are reproduced below in Tables 1 and 2. The results indicate that a lubricant comprising the diamond nanoparticles in a carrier oil may be effective to reduce volumetric wear by greater than 15% compared against the pure carrier oil, as demonstrated by a test run in accordance with ASTM D2714.

TABLE 1

Results using oil comprising diamond nanoparticles
Method: ASTM D 2714, Calibration and Operation
of the Falex Block on Ring Test Machine Test Parameters

| | | | |
|---|---|---|---|
| Speed (rpm): | 72 | Test Load (lb): | 150 |
| Temperature (C.): | Ambient | Fluid: | 4GQ |
| Duration cycles: | 5000 | Falex TL #: | 9317 |

Test Specimens

| | | | |
|---|---|---|---|
| Block Type: | Falex H-30 | Ring Type: | Falex S-10 |
| Material: | SAE 01 Tool Steel | Material: | SAE 4620 Steel |
| Finish (rms): | 4-8 | Finish (rms): | 6-12 |
| Hardness (Rc): | 27-33 | Harness (Rc): | 58-63 |

Test Results

| Mass Data: | Block | Ring | Block Scar Data: | |
|---|---|---|---|---|
| Initial: | 7.8452 | 22.2135 | Measurement 1 (mm): | 1.400 |
| Final: | 7.8448 | 22.2135 | Measurement 2 (mm): | 1.453 |
| Loss: | 0.0004 | 0.0000 | Measurement 3 (mm): | 1.400 |
| | | | Average Scar (mm): | 1.418 |
| | | | Standard Deviation: | 0.025 |
| | | | Coefficient of Variation (%): | 1.762 |
| | | | Volumetric Wear ($mm^3$): | 0.0862 |

Friction Data

| Duration | Friction Force, lb | Coefficient of Friction |
|---|---|---|
| 0 | 42.8 | 0.285 |
| 200 | 25.4 | 0.169 |
| 400 | 23.4 | 0.156 |
| 600 | 23.5 | 0.157 |
| 4500 | 22.3 | 0.149 |
| 5000 | 21.1 | 0.141 |
| | Average: | 0.154 |

Comments:
ASTM Test modified by use of special fluid application. One drop of lubricant applied to the test block and one drop applied to the test ring circumference. Fluid appeared clean and same color as originally applied at end of the test.

TABLE 2

Results using carrier oil
Method: ASTM D 2714, Calibration and Operation
of the Falex Block on Ring Test Machine Test Parameters

| | | | |
|---|---|---|---|
| Speed (rpm): | 72 | Test Load (lb): | 150 |
| Temperature (C.): | Ambient | Fluid: | QSD3 |
| Duration cycles: | 5000 | Falex TL #: | 9320 |

Test Specimens

| | | | |
|---|---|---|---|
| Block Type: | Falex H-30 | Ring Type: | Falex S-10 |
| Material: | SAE 01 Tool Steel | Material: | SAE 4620 Steel |
| Finish (rms): | 4-8 | Finish (rms): | 6-12 |
| Hardness (Rc): | 27-33 | Harness (Rc): | 58-63 |

Test Results

| Mass Data: | Block | Ring | Block Scar Data: | |
|---|---|---|---|---|
| Initial: | 7.8643 | 22.4047 | Measurement 1 (mm): | 2.440 |

TABLE 2-continued

Results using carrier oil
Method: ASTM D 2714, Calibration and Operation
of the Falex Block on Ring Test Machine

| Final: | 7.8614 | 22.4040 | Measurement 2 (mm): | 2.400 |
|---|---|---|---|---|
| Loss: | 0.0029 | 0.0007 | Measurement 3 (mm): | 2.333 |
| | | | Average Scar (mm): | 2.391 |
| | | | Standard Deviation: | 0.044 |
| | | | Coefficient of Variation (%): | 1.846 |
| | | | Volumetric Wear (mm$^3$): | 0.4140 |

Friction Data

| Duration | Friction Force, lb | Coefficient of Friction |
|---|---|---|
| 0 | 40 | 0.267 |
| 200 | 25.1 | 0.167 |
| 400 | 22 | 0.147 |
| 600 | 21.4 | 0.143 |
| 4500 | 21.2 | 0.141 |
| 5000 | 19.8 | 0.132 |
| | Average: | 0.146 |

Comments:
ASTM Test modified by use of special fluid application. One drop of lubricant applied to the test block and one drop applied to the test ring circumference. Fluid appeared contaminated and darkened or burnt at the end of the test.

Figure 7A:
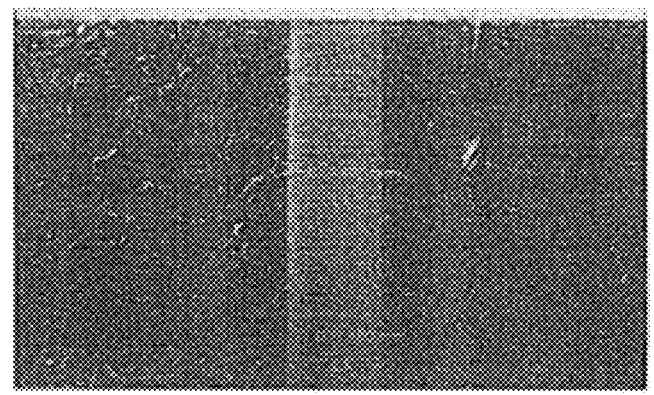
FIG. 7A is an image of a wear mark from a four ball wear test performed using ASTM D 2714 after application of a lubricant comprising a carrier oil and nanodiamond particles produced in accordance with the present invention.
Figure 7B:
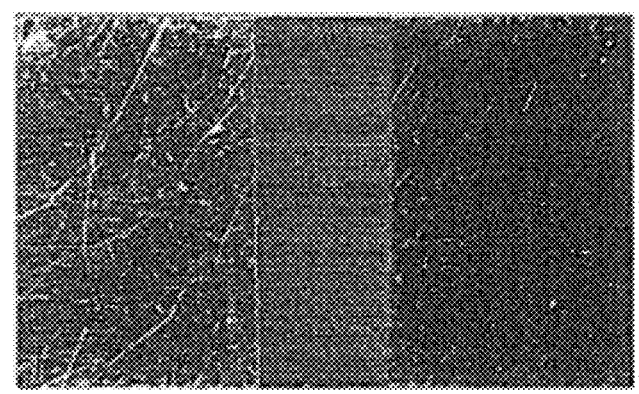
FIG. 7B is an image of a wear mark from a four ball wear test performed using ASTM D 2714 after application of a lubricant comprising only the carrier oil.

FIGS. 7A and 7B further demonstrate the difference in volumetric wear between the sample containing the diamond nanoparticles and the sample containing only carrier oil. Specifically the wear mark in the center of FIG. 7A, the result of performing the test using the carrier oil comprising the diamond nanoparticles, is greatly reduced from the wear mark in the center of FIG. 7B, the result of performing the test using only carrier oil.

From this testing, it was demonstrated that (1) wear was reduced by an estimated 90% compared with pure carrier oil; (2) surface abrasion and scoring were virtually eliminated when compared with pure carrier oil; (3) surfaces were evenly worn compared to those using pure carrier oil; and (4) thermal breakdown did not occur in samples treated with the diamond nanoparticles, as it did with samples treated with pure carrier oil. These tests also indicated the effects of increased protection from wear as a lubricant comprising the nanodiamond particles is subjected to increased loads, though additional research is needed to confirm this effect.

The lubricant compositions can be prepared by adding the nanodiamond to a carrier oil. In some embodiments, the carrier oil may be selected from the petroleum and/or synthetic oils. The lubricant may comprise less than 5 grams of the nanodiamond particles per gallon of carrier oil. The nanodiamond may provide thermal protection to the lubricant, thereby extending the useful life of the lubricant.

It can be seen that the described embodiments provide unique and novel compositions and lubricants that have a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A process for preparing a composition comprising substantially spherical nanodiamond particles comprising:
    subjecting a carbonaceous feedstock to a pulsed dense plasma radiation comprising heavy ions and having an energy of at least approximately 50 MeV, so as to produce a composition comprising spherical nanodiamond particles;
    wherein the pulsed dense plasma radiation is produced by a pulsed plasma drive electromagnetic motor generator comprising a power source, one or more magnetic or electromagnetic elements, one or more focus elements, and a reaction chamber;
    wherein the substantially spherical nanodiamond particles are characterized by a raman spectra that is indicative of diamond-like carbon; and
    wherein the substantially spherical nanodiamond particles have substantially smooth surfaces.

2. The process of claim 1, wherein the spherical nanodiamond particles are characterized by a raman spectra in which the K band is absent.

3. The process of claim 1, wherein the spherical nanodiamond particles have diameters between about 0.01 and about 10 nm.

4. The process of claim 1, wherein the spherical nanodiamond particles have diameters between about 0.1 nm and about 2 nm.

5. The process of claim 1, wherein the substantially spherical nanodiamond particles have diameters less than 5 µm.

6. The process of claim 1, wherein the composition is in the form of a powder.

7. The process of claim 1, wherein subjecting the carbonaceous feedstock to a pulsed dense plasma radiation is performed at ambient temperature and pressure.

8. The process of claim 1, wherein the pulsed dense plasma has an energy between 50 MeV and 1000 MeV.

9. The process of claim 1, wherein the carbonaceous feedstock contains at least 5 percent carbon by weight.

10. The process of claim 9, wherein the carbonaceous feedstock contains at least 20 percent carbon by weight.

11. The process of claim 1, wherein the carbonaceous feedstock comprises graphite, lignite, coal, or a combination thereof.

12. The process of claim 1, wherein the carbonaceous feedstock comprises a synthetic hydrocarbon, an organic oil, a crude oil, a petroleum distillate, or a combination thereof.

\* \* \* \* \*